(12) United States Patent
Smith et al.

(10) Patent No.: US 7,550,555 B2
(45) Date of Patent: Jun. 23, 2009

(54) SINTERING ULTRAHIGH MOLECULAR WEIGHT POLYETHYLENE

(75) Inventors: Paul Smith, Zurich (CH); Jeroen Visjager, Cleves, OH (US); Theo Tervoort, Zurich (CH)

(73) Assignee: Smith & Nephew Orthopaedics AG, Rotkreuz (CH)

( * ) Notice: Subject to any disclaimer, the term of this patent is extended or adjusted under 35 U.S.C. 154(b) by 224 days.

(21) Appl. No.: 10/501,936

(22) PCT Filed: Jan. 24, 2003

(86) PCT No.: PCT/IB03/00636

§ 371 (c)(1),
(2), (4) Date: May 19, 2006

(87) PCT Pub. No.: WO03/064141

PCT Pub. Date: Aug. 7, 2003

(65) Prior Publication Data

US 2008/0085982 A1 Apr. 10, 2008

Related U.S. Application Data

(60) Provisional application No. 60/352,208, filed on Jan. 29, 2002.

(51) Int. Cl.
*C08F 6/00* (2006.01)
*C08J 3/00* (2006.01)

(52) U.S. Cl. .............. 528/480; 264/175; 264/281; 264/210.7; 264/290.2; 428/220; 428/343; 428/349; 428/402; 525/199; 525/200; 526/247; 526/250; 528/271; 528/272; 528/274; 528/283

(58) Field of Classification Search ............ 428/422, 428/220, 343, 349, 402; 525/199, 200; 526/247, 526/250; 264/175, 281, 210.7, 290.2; 528/271, 528/272, 274, 283, 480
See application file for complete search history.

(56) References Cited

U.S. PATENT DOCUMENTS

| | | | |
|---|---|---|---|
| 3,051,993 A * | 9/1962 | Conrad et al. ............ 264/85 |
| 4,587,163 A | 5/1986 | Zachariades | |
| 4,888,141 A | 12/1989 | Bastiaansen et al. | |
| 5,037,928 A | 8/1991 | Li et al. | |
| 5,414,049 A | 5/1995 | Sun et al. | |
| 5,449,745 A | 9/1995 | Sun et al. | |
| 5,543,471 A | 8/1996 | Sun et al. | |
| 5,577,368 A | 11/1996 | Hamilton et al. | |
| 5,621,070 A | 4/1997 | Howard, Jr. | |
| 5,650,485 A | 7/1997 | Sun et al. | |
| 5,721,334 A | 2/1998 | Burstein et al. | |
| 5,728,748 A | 3/1998 | Sun et al. | |
| 5,824,411 A | 10/1998 | Shalaby et al. | |
| 5,834,113 A | 11/1998 | Shalaby et al. | |
| 5,834,393 A | 11/1998 | Jacobsen et al. | |
| 5,879,400 A | 3/1999 | Merrill et al. | |
| 6,017,975 A | 1/2000 | Saum et al. | |
| 6,168,626 B1 | 1/2001 | Hyon et al. | |
| 6,228,900 B1 | 5/2001 | Shen et al. | |
| 6,281,264 B1 | 8/2001 | Salovey et al. | |
| 6,506,866 B2 | 1/2003 | Jacobsen et al. | |
| 6,548,612 B2 * | 4/2003 | Smith et al. ............ 526/255 |
| 6,737,165 B1 * | 5/2004 | Smith et al. ............ 428/422 |
| 6,800,670 B2 | 10/2004 | Shen et al. | |
| 7,160,623 B2 * | 1/2007 | Smith et al. ............ 428/422 |
| 7,276,287 B2 * | 10/2007 | Smith et al. ............ 428/422 |
| 7,364,685 B2 | 4/2008 | Schmotzer | |

FOREIGN PATENT DOCUMENTS

| | | |
|---|---|---|
| EP | 0135253 | 3/1985 |
| EP | 0 701 453 | 9/1998 |
| EP | 1 005 872 | 6/2000 |
| EP | 0 847 765 | 9/2000 |
| EP | 1 072 274 | 1/2001 |
| EP | 1 072 275 | 1/2001 |
| EP | 1 086 709 | 3/2001 |
| EP | 0 729 981 | 3/2002 |
| EP | 0 722 973 | 12/2003 |
| EP | 0 731 481 | 9/2004 |
| JP | 61061821 | 3/1986 |
| JP | 63118234 | 5/1988 |
| JP | 2214647 | 8/1990 |
| WO | WO95/06148 | 3/1995 |
| WO | WO95/21212 | 8/1995 |
| WO | WO97/29793 | 8/1997 |
| WO | WO97/29895 | 8/1997 |
| WO | WO98/01085 | 1/1998 |
| WO | WO98/14223 | 4/1998 |
| WO | WO98/16258 | 4/1998 |
| WO | WO01/05337 | 1/2001 |
| WO | WO03/031140 | 4/2003 |

OTHER PUBLICATIONS

Lada Corbeij-Kurelec; "Chain Mobility in Polymer Systems; On the Borderline between Solid and Melt"; Eindhoven; Technische Universiteit Eindhoven, 2001; Chapter 3.
Japanese office action dated Jan. 6, 2009 for App. No. 2003-563802.

* cited by examiner

*Primary Examiner*—Terressa M Boykin
(74) *Attorney, Agent, or Firm*—Knobbe, Martens, Olson & Bear, LLP

(57) ABSTRACT

Ultrahigh molecular weight polyethylene compositions of highly beneficial sintering characteristics are disclosed and methods for making and processing same. Additionally, products comprising these compositions are described.

24 Claims, No Drawings

SINTERING ULTRAHIGH MOLECULAR WEIGHT POLYETHYLENE

CROSS REFERENCE TO RELATED APPLICATIONS

This application is the National Phase application of International Application No. PCT/ID03/00636, filed Jan. 24, 2003, which was published in English and designates the United States of America, and which further claims the benefit of U.S. Provisional Ser. No. 60/352,208, filed Jan. 29, 2002. These applications, in their entirety, are incorporated herein by reference.

FIELD OF THE INVENTION

This invention relates to processes for sintering ultrahigh molecular weight polyethylene (UHMW PE), to products obtained therewith, and to compositions comprising UHMW PE.

BACKGROUND OF THE INVENTION

Ultrahigh molecular weight polyethylene (UHMW PE) is well known for, among other properties, its chemical resistance, low friction coefficient, high toughness, and resistance against wear. As a result, it has found numerous applications in demanding environments where the above properties are required, such as in the chemical industry, mining, mechanical engineering, the field of biomedical implants and the textile industry. Equally well known is the intractability of this polymer, which is due to the fact that UHMW PE, above its crystalline melting temperature, does not form a fluid phase that is of a viscosity that permits melt-processing techniques used with common thermoplastic polymers. A negative consequence of the fact that above its crystalline melting temperature UHMW PE merely passes into a viscoelastic state, is that the original polymer particles soften but still retain their shape, and long processing times and/or high temperatures are generally required to process UHMW PE into useful objects. Indeed, even at 200° C. and after prolonged heating, the initial powder morphology often is retained, and generally is present in articles made of UHMW PE. The latter, in fact, is thought to contribute to abrasive wear and ultimate failure of, for example, artificial implants made from this polymer.

The above problems have been recognized since long, and various methods have been proposed to improve processing of UHMW PE, reduce the processing times and associated costs, reduce the granular nature of products made thereof, and generally further improve their properties, notably the resistance against wear. See, for instance, U.S. Pat. Nos. 5,621,070, 5,721,334, 4,587,163, and 5,037,928. In the methods described in these patents, objects of UHMW PE are produced essentially by compression and sintering under different pressure—and temperature time protocols. The sintering processes described in these patents are comparatively lengthy, however. Another method to process UHMW PE into shapes is described by Corbeij-Kurelec, L. (Ph. D. Thesis, Technische Universiteit Eindhoven, the Netherlands, 2001). In this method, a particular as-polymerized or virgin UHMW PE powder is compacted and subsequently melted. As the author notes, however, the process appears to be not generally applicable and typically limited to polymers based on single-site metallocene catalysts (p. 48).

Other techniques to circumvent the intractability of UHMW PE include, for example, the addition of solvents, lubricants, plasticizers, and processing aids, as well as polyethylene grades of lower molecular weight. See, e.g., U. S. Pat. Nos. 5,658,992 and 5,422,061. The aforementioned additions of lubricants, plasticizers, and processing aids or lower molecular weight polyethylenes, however, tend to cause a deterioration of some or substantially all of the beneficial properties of UHMW PE.

Unfortunately, the above methods generally are cumbersome, time consuming, not economical or ill defined, and/or severely limit the types and characteristics of objects and products that can be manufactured with UHMW PE.

Thus, a need continues to exist for a method that readily processes ultrahigh molecular weight polyethylenes into coherent articles and exploits the outstanding properties of this unique polymer in a wider and more economical spectrum of product forms.

Accordingly, it is one objective of the present invention to provide UHMW PE compositions of highly beneficial sintering characteristics.

Yet another object is to provide a method to produce UHMW PE compositions of highly beneficial sintering characteristics.

Additionally, it is an object of the present invention to provide a method to process UHMW PE compositions into useful shapes and articles.

Still another object of the present invention is to provide useful shapes and articles that are manufactured by sintering of UHMW PE compositions

SUMMARY OF THE INVENTION

The present invention provides UHMW PE compositions of highly beneficial sintering characteristics, and compositions and articles comprising at least in part a continuous polymeric phase comprising said compositions.

In addition, the present invention provides methods that are capable of processing UHMW PE into articles having high resistance against wear while subjecting the UHMW PE for only a comparatively short time to a temperature above its melting temperature.

In one embodiment, the present invention provides a method comprising:
  (a) at least partly disentangling UHMW PE (e.g. by a process comprising swelling the UHMW PE with a swelling agent and subsequently removing the swelling agent);
  (b) heating the UHMW PE to a temperature between room temperature and the crystalline melting temperature of the UHMW PE;
  (c) compacting the UHMW PE at a temperature between room temperature and the crystalline melting temperature of the UHMW PE;
  (d) heating the compacted UHMW PE to a temperature above its crystalline melting temperature;
  (e) cooling the UHMW PE to below its crystalline melting temperature.

Additional objects, advantages and features of the present invention are set forth in this specification, and in part will become apparent to those skilled in the art on examination of the following, or may be learned by practice of the invention. The inventions disclosed in this application are not limited to any particular set of or combination of objects, advantages and features. It is contemplated that various combinations of the stated objects, advantages and features make up the inventions disclosed in this application.

DETAILED DESCRIPTION OF THE INVENTION

The following are certain defined terms used herein:

Monomeric units refer to a portion of a polymer that corresponds to the monomer reactant used to form the polymer. For example, —$CH_2CH_2$— represents a monomeric unit derived from the monomer reactant ethylene.

The terms polyethylenes and PE grades as used herein refer to the ethylene polymers exclusive of the fillers and/or other components. It is understood and well known that added matter, such as fillers, reinforcing matter, dyes, plasticizers and the like, may influence various material characteristics. The added matter, and the possible resulting effect on materials properties, however, is not to be considered in defining the particular set of properties of the UHMW PE grades of the present invention.

The Polyethylenes

The polyethylenes according to the present invention generally are polymers of ethylene. Within the scope of the present invention it is contemplated, however, that the PE may also comprise certain amounts of one or more of the commonly employed co-monomers such as alpha-olefins containing 3-20 carbon atoms such as propylene, 1-butene, 1-pentene, 4-methyl-1-pentene, 1-hexene, 1-octene, 4,6-dimethyl-1-heptene, 1-decene, 1-tetradecene, 1-hexadecene, 1-octadecene, 1-eicosene, allylcyclohexane, and the like, at least partially fluorinated alpha-olefins such as tetrafluoroethylene, chlorotrifluoroethylene, and the like, alkenecarboxylic acids, carbon monoxide, vinyl acetate, vinyl alcohol, alkyl acrylates such as methyl acrylate, ethyl acrylate, butyl acrylate, and the like, or mixtures thereof, provided, however that the latter do not significantly adversely affect the unique properties, such as thermal, chemical stability and wear resistance of the UHMW PE homopolymer. Preferably, the amount of such co-monomer is less than about 10 mole percent (herein "mol %"), for instance less than about 5 mol %, or less than about 3 mol %. Accordingly, the amount of co-monomer on a weight basis may be less than 10 wt %, for instance less than 5 wt %, such as in the range of 0.5-5 wt % or 1-4 wt %.

In one embodiment of the present invention the polyethylenes are of ultrahigh molecular weight. An indication of the molecular weight of polymers can be obtained with the often-employed method of gel permeation chromatography, but for UHMW PE more commonly is estimated from the melt-viscosity or intrinsic viscosity or limiting viscosity number. Preferably, the UHMW PE grades according to the present invention have a value of the weight-average molecular weight ($M_w$) of more than 1,000,000 g/mol, for instance more than 1,500,000, or more than 2,000,000 g/mol. Particularly preferred are UHMW PE grades of $M_w$ of more than 3,000,000 g/mol, for instance more than 4,000,000 g/mol, more than 5,000,000 g/mol, more than 6,000,000 g/mol, more than 7,000,000 g/mol, and even more than 10,000,000 g/mol. Especially the higher molecular weight materials have historically been exceedingly difficult to sinter into objects free of grain boundaries, and in particular for these materials the present invention is highly beneficial and useful.

Generally, according to the present invention, the polydispersity (the ratio between the weight—and number average molecular weight) of the polyethylenes can vary, and is more than 1, for instance more than 2, more than 2.5, or more than 3. Preferably the polydispersity is less than 100, for instance less than 75 or less than 50. Particularly beneficial in the context of manufacturing objects of high resistance against wear are those UHMW PE grades that are of a narrow molecular weight distribution, for instance of a value of the polydispersity of less than 20, less than 15, or less than 10. See also U.S. application Ser. No. 10/002,616, which is hereby incorporated in its entirety by reference.

Preferred polyethylene grades according to the present invention include those having a melting temperature (in this specification, unless indicated otherwise, of once-molten and recrystallized material) of at least 105° C., for instance at least 115° C., at least 125° C., or at least 135° C.

Ultrahigh molecular weight polyethylene grades according to one embodiment of the present invention include those having:

(i) a weight-average molecular weight in the range of 2,000,000-10,000,000 g/mol;

(ii) a co-monomer content of up to 5 wt %; and (iii) a melting temperature of at least 115° C.

The UHMW PE grades for use in the present invention can be synthesized according to any of the chemical methods for the polymerization of ethylene as described in detail in the literature (for example, Whiteley, K. S., in Industrial Polymers Handbook, Wilkes, E. S. ed., Wiley-VCH, Volume 2, pp. 643-691, 2001) and as practiced in the art. For the present invention, the method and conditions of synthesis and the choice of catalyst systems and other variables may be varied, provided that UHMW PE is obtained. Many UHMW PE grades are products of commerce, and may be used in the present invention.

Imparting Highly Beneficial Sintering Characteristics

As used herein, the indication "highly beneficial sintering characteristics" means that the polymer can be substantially sintered, after which it is substantially free of memory of the pre-sintered morphology, and exhibits enhanced mechanical properties, in particular resistance against abrasive wear, in a comparatively short period of time and/or at relatively low sintering temperatures. More specifically, according to the present invention, UHMW PE of highly beneficial sintering characteristics include those being defined as UHMW PE grades which:

i) when first compressed into a sheet of 0.3 mm thickness during 10 min under a pressure of 80 MPa and at a temperature that is the lower of 125° C. or 10° C. below the peak melting temperature of the polymer;

ii) subsequently sintered for a period of 3 min at 180° C. at 80 MPa;

iii) and then cooled to room temperature;

iv) yield objects that have a wear coefficient that is less than 80% of that of reference, sintered UHMW PE, which is produced by compression and sintering the polymer directly at 180° C. for the same total period of time; for example less than 70%, less than 60%, less than 50%, such as in the range of 40-50%, less than 30%, or less than 20% of that of said reference, sintered UHMW PE.

(The method of determining the wear coefficient is detailed in the Examples section below).

Methods

The present invention provides methods that are capable of processing UHMW PE into articles having high resistance against wear while subjecting the UHMW PE for only a comparatively short time to a temperature above its melting temperature.

In one embodiment, the present invention provides a method comprising:

(a) at least partly disentangling UHMW PE (e.g. by a process comprising swelling the UHMW PE with a swelling agent and subsequently removing the swelling agent);

(b) heating the UHMW PE to a temperature between room temperature and the crystalline melting temperature of the UHMW PE;

(c) compacting the UHMW PE at a temperature between room temperature and the crystalline melting temperature of the UHMW PE;

(d) heating the compacted UHMW PE to a temperature above its crystalline melting temperature; and (e) cooling the UHMW PE to below its crystalline melting temperature.

The time for subjecting the UHMW PE to a temperature above its melting temperature during step (d) in the present methods will generally vary with the size and shape of the articles produced. The melting time needed to attain a certain wear resistance for a particular article produced by the present process is, however, lower than the time needed for the same article produced with the same UHMW PE starting material using a comparable process, with the only difference that said comparable process is absent the above-noted step (a). This benefit may be particularly pronounced if the UHMW PE starting material is a relatively highly entangled UHMW PE grade. Depending on the size and shape of the article, the percent reduction in time in heating step (a) may vary. Preferably the present process results in 10% less required melting time than said comparable process, for instance less than 25%, less than 50%, less than 70%, or even less than 90% melting time (for instance less than 10 minutes instead of 100 minutes).

Preferred melting times during step (d) may vary depending on the size and shape of the article produced. Typical times include, but are not limited to, those that are less than 60 minutes, for instance less than 45 minutes, less than 30 minutes, less than 15 minutes, less than 10 minutes, less than 5 minutes, or even less than 3 minutes.

(a): At Least Partly Disentangling the UHMW PE

According to the present invention, highly beneficial sintering characteristics may be imparted to the UHMW PE grades described above by a disentangling procedure (disentangling polymer chains in the UHMW PE grade), e.g. by a remarkably simple swelling procedure. Swelling of polymers, for example due to sorption of a solvent, is well known in the art and the general conditions for, and phenomena associated with swelling of polymers have been described (see, for example, Treloar, L. R. G., The Physics of Rubber Elasticity, $2^{nd}$ ed., Oxford (1958), which is incorporated herein by reference). Swelling has been employed, for example, as one step in an elaborate process for preparing high tensile strength and modulus products from polyolefins (See, e.g., U.S. Pat. No. 4,938,911). However, imparting highly beneficial sintering characteristics to UHMW PE by swelling and, subsequently, forming objects of a high resistance to wear by heating the material above the melting temperature, as described in this application has not been disclosed or suggested. In contrast to the present invention, in fact, in the above patent it is preferred to post-treat swollen objects below the melting point of the polymer.

In the swelling procedure according to the present invention in its general form, solid UHMW PE is exposed to a medium and under conditions that cause swelling of the polymer; subsequently, the swelling agent is removed, and, surprisingly, UHMW PE of highly beneficial sintering characteristics is obtained.

In one embodiment, ready-synthesized UHMW PE powder is suspended in a fluid, fluid bed or other means that permits rapid access to the material, which comprise at least one species that has sufficient physico-chemical affinity to the polymer to cause the latter to swell by sorption into it. The fluid can be, for example, the swelling agent itself, a mixture of swelling agents, an emulsion of one or more swelling agents in a non- or weakly swelling medium and the like, which also may comprise a surfactant or other emulsion stabilizers. A fluid bed can comprise the UHMW PE powder and a gas or vapor of one or more swelling agents, optionally mixed with gases or vapors of non- or weakly swelling species. Alternatively, the UHMW PE powder can be spread, for example, onto a conveyor belt that moves through an atmosphere that comprises a gas or vapor of one or more swelling agents. Additional means of exposing UHMW PE powder to one or more swelling agents exist and are known to those skilled in the art of treating powders.

The choice of the swelling agent may depend on considerations of costs, environmental issues, safety, and other economical or practical concerns. Nonetheless, all species employed as swelling agents according to the present invention exhibit sufficient physico-chemical affinity to the polymer to be sorbed into the material and to cause it to swell. Suitability for a substance to be a swelling agent can be determined by the known rules of the solubility parameters of polymer-solvent systems (for example, Encyclopedia of Polymer Science and Technology, Eds. Mark, H. F. et al., Wiley (1989), vol. 15, p. 394). Also, in one embodiment, swelling agents are those species that can dissolve polyethylenes of lower molecular weight or that are branched (for example, Polymer Handbook $4^{th}$ Edition, Eds. Brandrup, J. et al., Wiley (1999), p. VII/497. Examples of species that may be used as swelling agents include hydrocarbons, such as hexane, heptane, octane, decahydronaphthalene and the like, aromatic hydrocarbons, such as xylenes, toluene and the like, halogenated hydrocarbons, halogenated aromatic hydrocarbons, such as chlorinated benzenes and the like, higher aliphatic esters and ketones, and the like. Also useful, especially when employed at elevated pressures where the species may form a fluid or supercritical fluid are compounds that are chemically similar to the above referred species, but at ambient pressure have boiling temperatures that are below the temperature at which swelling is carried out. Examples include, but are not limited to, ethane, propane, butane, pentane and the like. Other examples of swelling agents include species that may also be employed as monomer, such as ethylene and alpha-olefins containing 3-20 carbon atoms such as propylene, 1-butene, 1-pentene, 4-methyl-1-pentene, 1-hexene, 1-octene, 4,6-dimethyl-1-heptene, 1-decene, 1-tetradecene, 1-hexadecene, 1-octadecene, 1-eicosene, allylcyclohexane, and the like. As noted above, these species may be used in fluid- or vapor-form; in one preferred embodiment the swelling agent is a supercritical fluid, which permits rapid diffusion into the polymer, and facile removal from the swollen polymer, for example by reduction of pressure and flashing off the swelling agent.

The temperature at which the swelling is carried out depends on the particular choice of the swelling agent(s) and the form and means by which the polymer is exposed. In one preferred embodiment, swelling is carried out below the melting temperature of the polymer, for instance to avoid excessive coalescence or sticking of the swollen polymer particles. In another embodiment, swelling is carried above the melting temperature of the polymer, for instance to enhance the rate of diffusion of the swelling agent(s) into the polymer. In the latter procedure, when carried out to produce UHMW PE powder of highly beneficial sintering characteristics, excessive coalescence or sticking may be prevented by for example suspending the polymer present in an emulsion of the swelling agent(s) in a non-solvent for the polymer. Generally, the minimum temperature for swelling depends on the melting temperature of the UHMW PE. For example, polymers of a relatively high co-monomer content have a lower melting temperature than the homopolymer, and, consequently, display swelling at lower temperatures. Nonetheless, a preferred minimum temperature for rapid swelling of the UHMW PE grades according to the present invention is at least about 50° C., for example above 55° C., above 60° C., or above 65° C.

Preferably, the swollen polymer comprises from about 30% to 99% by weight of swelling agent, for instance from 35% to 97% by weight, from 40% to 95% by weight, from 50% to 90% by weight, or from 60% to 90% by weight.

The time during which the polymer is exposed to the swelling agent may vary, and is determined by, among other things, the size and porosity of the UHMW PE powder and the temperature and state of matter of the swelling medium. As mentioned above, supercritical fluids are well known to permit extremely rapid diffusion, and employment of such media permits the swelling time to be short. Also, highly porous particles of UHMW PE reach the desired degree of swelling in a shorter time than more dense powder. The progress of the degree of swelling, and the time for completion of the process can readily be determined by monitoring the uptake of swelling agent, for example by the increase in weight of the UHMW PE particles, or alternatively by determining the relative increase in volume.

After completion of the swelling process, swelling is substantially arrested usually by lowering the temperature. Subsequently the swelling agent is removed by drying or other means. Alternatively, the swollen polymer particles are transferred into another liquid that extracts the swelling agent. Yet another method, which is particularly useful when supercritical fluids are used as swelling agents, is that the latter are flashed off.

Preferably, the UHMW PE used for the swelling step is a powder. However, the UHMW PE may be in a form that is different from a powder, for example a partially or substantially fully sintered object such as a tape, sheet, block, machined part and the like. Swelling may be effectuated through the entire object, or only part of it, for example only a surface layer.

In still another preferred embodiment according to the present invention, swelling is carried out during or immediately after chemical synthesis of the ultrahigh molecular weight polyethylene. Particularly useful in this embodiment is to employ as swelling agent one or more monomers or a mixture of monomer and suspending fluid, if used in the synthesis.

(b) Heating the UHMW PE to a Temperature between Room Temperature and the Crystalline Melting Temperature of the UHMW PE.

Step (b), heating the composition to a temperature that is below the crystalline melting temperature of the UHMW PE's, is carried out in order to facilitate flow and coalescence of the polymer particles, but not to create a melt. The latter would cause reduction, or even complete loss of the highly beneficial sintering characteristics of the UHMW PE. Typically, the UHMW PE is heated to a temperature where the polymer molecules display a significant mobility in the solid state. For the present UHMW PE, typically this is above about 60° C., for example, above 75° C., for instance above 100° C., although lower temperatures may be employed. Invariably, though, the polymer remains substantially in its solid-state to prevent loss of the highly beneficial sintering characteristics, which -as stated above- occurs on melting (see Comparative Example D). Thus, the upper limit of the temperature at which step (b) is carried out is a least about 1° C., (e.g. at least 3° C., at least 5° C., or at least 10° C.) below the peak melting temperature of the UHMW PE's, which typically are in the range from about 100° C. to about 150° C., although somewhat lower and higher temperatures may occur. (It should be noted that the process of imparting highly beneficial sintering characteristics through swelling may raise the melting temperature of the polymer. In that case, the reference is the latter melting temperature, and not of that of once molten and recrystallized material).

(c) Compacting the UHMW PE at a Temperature between Room Temperature and the Crystalline Melting Temperature of the UHMW PE.

In step (c), which optionally may be simultaneously carried out with step (b), the heated but substantially solid UHMW PE composition is compressed, preferably to yield a mechanically coherent material that is substantially free of grain boundaries and of memory of its original granular morphology. The pressures, as well as the time needed to achieve this compaction may vary widely, depending on the shape and dimensions of the objects that are made. Typically, however, the applied pressures are in the range from about 10 MPa to about 200 MPa, although somewhat lower and higher pressures may be applied without losing the benefit of the present invention. Compression times typically are at least 10 sec, for example at least 30 sec, at least 1 min, or at least 10 min. Much longer times, for example more than 60 min, may be useful for complex and/or large parts, but such long compaction times are often unnecessary and may be uneconomical.

(d) Heating the Compacted UHMW PE to a Temperature above its Crystalline Melting Temperature.

Subsequently, in step (d), which must be carried out only after steps (b) and (c) are completed, the solid-state-compacted object generated in step (c) is heated to a temperature that is above the crystalline melting temperature of the UHMW PE, and is sintered while applying pressure. The temperatures at which the sintering step (d) is carried out are above the melting temperature of the UHMW PE, but preferably are below temperatures at which substantial degradation of the polymer may occur. Thus, a lower limit for the sintering temperature is more than about 2° C. above the melting temperature, for instance more than about 5° C., more than about 10° C., more than about 20° C., more than about 30° C., more than about 40° C., or more than about 50° C. Absent special precautions, such as the uneconomical exclusion of oxygen, polyolefins may display signs of degradation at temperatures well above 200° C. Hence, for sintering of the UHMW PE's according to the present invention, step (d) is preferably carried out at temperatures below 250° C., for instance below 230° C., below 210° C. or below 190° C. The time for completion of the sintering process may vary widely, and is dependent on, among other things, the size and shape of the object and the efficiency of heat transfer. Also, the pressure applied during the sintering process may vary widely, depending on the shape and dimensions of the objects that are made. Typically, however, the applied pressures are in the range from about 10 MPa to about 200 MPa, although somewhat lower and higher pressures may be applied without losing the benefit of the present invention. Generally, both sintering-temperatures and times may be well below those employed for standard UHMW PE sintering. As shown in the examples below, for instance, sheets of 0.3 mm thickness, according to the present invention may be substantially sintered in as little as 3 min at a temperature as low as 160° C.

(e) Cooling the UHMW PE to Below its Crystalline Melting Temperature.

In step (e) according to the present invention, the sintered object is cooled to below its melting temperature. The rate at which this is carried out may vary, although preferably no excessive thermal stresses are generated in the object during the cooling procedure.

In one embodiment, processing of at least partly disentangled, powdrous UHMW PE compositions comprising least partly disentangled, powdrous UHMW PE according to the present invention includes:

(b) heating the powder to a temperature of 125° C., which is below the crystalline melting temperature of the UHMW PE used;

(c) compression of the said composition, while it is in its predominantly solid state, for a period of 10 min at a pressure of 80 MPa, to yield a coherent material which is substantially free of grain boundaries or original powder morphology;

(d) sintering the compressed material at 180° C., which is above its crystalline melting temperature, for a period of 10 min at a pressure of 80 MPa;

(e) cooling the sintered material to room temperature during 4 min.

The present methods can provide objects or articles of improved resistance against abrasive wear, as illustrated in the examples that follow. Preferably, present methods comprising the above steps (a)-(e) provide UHMW PE articles having wear coefficients that are less than 0.8 times, for instance less than 0.7 or 0.6 times, the wear coefficients of identically shaped articles prepared with comparable processes starting with identical UHMW PE, except that the comparable processes do not comprise step (a).

It is contemplated that the UHMW PE compositions, materials and products made thereof, according to the present invention may be post-treated. In one embodiment the UHMW PE is cross-linked through, for example, irradiation and/or chemical means, for example to increase resistance to creep and even further improved resistance against wear. See, e.g. U.S. Pat. Nos. 6,242,507, 6,228,900, 3,956,253. Certain articles, such as, but not limited to, fibers and films made according to the present invention optionally may, subsequently, be drawn or otherwise deformed in one or more directions, embossed, and the like to further improve the physico-chemical, mechanical, barrier, optical and/or surface properties, or be otherwise post-treated (for instance, quenched, heat treated, pressure treated, and/or chemically treated). The above methods and numerous modifications thereof and other forming and shaping, and post-processing techniques are well known and commonly practiced. Those skilled in the art of processing of polymers are capable of selecting the appropriate processing and optional post-processing technology that is most economical and appropriate for the desired end product, or product intermediate.

The present invention also contemplates compositions and articles comprising a continuous phase having at least 15 wt %, preferably at least 45 wt %, and more preferably at least 95 wt % of the UHMW PE. An exemplary composition could include a composition or an article wherein the continuous phase is composed of at least 99 wt % of UHMW PE according to the present invention filled with a filler such as talc, glass and/or other inorganic or organic particles. It may be that the filler comprise a between 10 to 90 wt %, preferably between 10 and 45 wt % and for instance less than 30 wt % of the total composition (including continuous phase and filler).

The compositions according to the present invention optionally may include other polymers, additives, nucleating- and clarifying agents, colorants, fillers, reinforcing matter, such as glass-, aramid-, carbon fibers, plasticizers, lubricants, processing aids, blowing or foaming agents, electrically conducting matter, other polymers, including other polyethylenes, copolymers, and rubbers and thermoplastic rubber blends, and the like. Depending on the particular application, one or more of the above optional additional ingredients and their respective amounts are selected according to standard practices known to those skilled in the art of polymer processing, compounding and applications.

Properties

Preferably, products obtained by processes according to the present invention have a wear coefficient κ below $3.5\ 10^{-4}$ $mm^3/mN$, for instance below $2.8\ 10^{-4}\ mm^3/mN$, below $2.5\ 10^{-4}\ mm^3/mN$, below $2.2\ 10^{-4}\ mm^3/mN$, or below $2.0\ 10^{-4}\ mm^3/mN$.

Beneficial properties of the processed objects according to the present invention are not restricted, however, to wear only. Generally, the UHMW PE products according to the present invention exhibit good and useful mechanical properties, such as a high yield strength, high tensile strength, high elongation at break, impact strength and toughness, as well as good barrier properties and transparency. The yield strength of products obtained by the present invention is preferably at least 5 MPa, for instance at least 10 MPa, at least 20 MPa, or at least 40 MPa. The elongation at break of products obtained by the present invention is preferably at least 30%, for instance at least 75%, at least 150%, at least 200%, or at least 300%. The tensile strength of products obtained by the present invention is at least 10 MPa, for instance at least 25 MPa, at least 40 MPa, or at least 60 MPa. The double notched izod impact strength of products obtained by the present invention is preferably at least 0.25 J/m, for instance at least 0.35 J/m, at least 0.40 J/m, or at least 0.50 J/m (as measured according to test method HIMONT P116; See also Encyclopedia of Polymer Science, $2^{nd}$ Ed. (1986), Published by John Wiley & Sons, Volume 6, page 491, which page is hereby incorporated in its entirety by reference).

Products and Applications

The products contemplated according to the present invention are numerous, and cover different fields of applications. This is especially true as PE has been approved also for food contact and for biomedical applications. Without limiting the scope and use of the present invention, some illustrative products are indicated herein. Generally speaking, the products and materials according to the present invention include most or all applications that currently are covered by standard ultra-high molecular weight PE (cf. Harvey L. Stein: "Ultra High Molecular Weight Polyethylene. (UHMWPE)", Engineered Materials Handbook, Volume 2: Engineering Plastics, ASM International, Materials Park, Ohio 44073, USA (1999), pp. 167-171, which pages are hereby incorporated in their entirety by reference). Thus, applications are envisioned, among other industries, in the wire and cable industry, the printed-circuit board industry, semi-conductor industry, the chemical processing industry, the automotive industry, out-door products and coatings industry, the food industry, the biomedical industry, and more generally in industries and uses where any combination of high chemical resistance and high resistance against wear is required.

In particular, the PE may be used to form at least parts in articles such as, for example, a wire (and/or wire coating), an optical fiber (and/or coating), a cable, a printed-circuit board, a semiconductor, an automotive part, an outdoor product, a food-industry product, a biomedical intermediate or product such as artificial implants, orthopedic implants, a composite material, a mono- or multi-filament fiber, an oriented or un-oriented fiber, a hollow, porous or dense component; a woven or non-woven fabric, a filter, a membrane, a film, a multilayer- and/or multicomponent film, a barrier film, a battery separator film for primary or secondary batteries (e.g. lithium ion batteries), a container, a bag, a bottle, a rod, a liner, a vessel, a pipe, a pump, a valve, an O-ring, an expansion joint, a gasket, a heat exchanger, a sealable packaging, a profile, heat-shrinkable film, a thermoplastically welded part, a blow molded part, a roto-molded part, a ram extruded part, a screw extruded profile, fine particles formed by precipitation of a solution of the PE, fine particle additives for coatings; doctor blades, ski soles, snow board soles, snow mobile runners, hose linings, linings and internal components for vessels, tanks, columns, pipes, fittings, pumps, pump housings, valves, valve seats, tubes and fittings for beverage dispensing systems, sliding parts in printing devices, sliding parts in major appliances (dish washers, cloth washers, dryers, etc.), sliding parts in automotive devices (steering systems, steel cable guides), sliding parts in conveyor systems (flights), sliding parts in elevators and escalators, and the like. Other applications for which the homogeneity of the morphologies in this invention is important, is in the fabrication of industrial parts with abrasion resistance uses such as bearings, sprockets, gaskets, ball valve seats, conveyor belt parts and other industrial parts currently made from metals.

Due to the fact that the PE grades according to the present invention can be readily processed into mechanical coherent, tough, thin, dense and/or translucent objects, novel application areas for high wear resistant PE are contemplated that heretofore were not readily or economically, if at all, accessible due to the intractability of standard ultra-high molecular weight grades. The UHMW PE grades according to the present invention, due to their beneficial sintering characteristics, not only are useful for the simple and economic production of finished goods and intermediate products of high resistance against wear, but also for other functions. An illustrative example of such function, without limiting the scope of the present invention, is adhesion and welding. The latter is a well-recognized difficulty associated with common UHMW PE. The PE grades according to the present invention were found to be outstanding wear resistant adhesives, for example, for itself as well as for other ethylene polymers, preferably including common UHMW PE products such as profiles, parts, sheets and the like.

EXAMPLES

The following examples are given as particular embodiments of the invention and to demonstrate the practice and advantages thereof. It is understood that the examples are given by way of illustration and are not intended to limit the specification or the claims that follow in any manner.

Materials and General Methods

Materials. Various grades of UHMW PE were obtained from DSM and Ticona (Stamylan UH and GUR, respectively). Weight-average molecular weights were provided by the manufacturers.

Melting Temperatures. Melting temperatures ($T_m$) of the various PE's were determined with a Netzsch differential scanning calorimeter (DSC, model 200) calibrated with Indium. Samples of approximately 5 mg were heated at a rate of 10° C./min under nitrogen atmosphere. Melting temperatures refer to the endothermal peak of once molten (at 180° C.) and cooled (at 10° C./min) material, unless otherwise indicated.

Samples. Samples of 0.3 mm thickness and 25 mm diameter for wear tests were compression molded and sintered as indicated in the various examples below, and then cooled to room temperature during 4 min under 4 ton in a water-cooled Carver press.

Wear Coefficients. Abrasive wear measurements were carried out using a custom-built device according to specifications and method analogous to those described by Hutchings [Trezona, R. I., Allsopp, D. N., Hutchings, I. M., *Wear*, 229, 205 (1999), which article is hereby incorporated in its entirety by reference]. In the device, a hard sphere (1" Tungsten Carbide ball with a 400 nm surface roughness, Atlas Ball & Bearing Co. Ltd., UK) clamped between two coaxial driving shafts, rotated at a constant speed of 150 rpm. The sample was placed against the ball with a normal force of 0.27 N, while an abrasive slurry (0.75 g SiC (mean particle size of 4-5 microns) per $cm^3$ distilled water) was dripping onto the ball at a feed rate of 5 $cm^3$/min. The size of the resulting abrasive wear crater was measured with an optical microscope. In all cases, spherical craters were observed; the corresponding wear volume V was calculated according to:

$$V = \left(\frac{\pi d^4}{64R}\right)$$

where R is the ball radius and d is the surface chordal diameter of the crater [Rutherford, K. L., Hutchings, I. M., *J. Test. Eval.*, 25, 250 (1997)]. To correct the measured diameter of the wear craters (d), which typically consist of a central spherical crater surrounded by a roughened or 'scuffed' annular region, the following empirical rule (according to Trezona et al. [Trezona, R. I., Hutchings, I. M., *Wear*, 235, 209 (1999)] was applied:

$$d = \left(\frac{d' - 0.1407}{0.9358}\right) \text{ for } 0.5 \text{ mm} \leq d \leq 2.193 \text{ mm}$$

$$d = d' \text{ for } d > 2.193 \text{ mm}$$

For abrasive wear of homogeneous materials the wear volume is expected to be proportional to the product of the sliding distance S and the normal force N:

V=κ SN which defines the wear coefficient κ. In all experiments a normal force of 0.25 N was selected to ensure the linearity of this equation with respect to the applied force. In all tests the total number of ball rotations was chosen to be 9,000, which corresponds to a sliding distance of 718 m.

Comparative Example A

Stamylan UHMW PE UH 610 ($M_w$~6.10$^6$ g/mol; $T_m$=135.3° C.) samples were heated at 180° C. in a pre-heated press for 10 min at 1 metric ton (~20 MPa), subsequently, compressed and sintered at 180° C. at 4 ton (~80 MPa) for various periods of time (see Table 1), and then cooled to room temperature as described above. The wear coefficients κ of the different materials were determined according to above-described procedures. The results are collected in Table I.

TABLE I

| Sintering Time (min) | Wear Coefficient, κ ($10^{-4}$ mm$^3$/mN) |
| --- | --- |
| 3 | 5.6 |
| 3 | 5.5 |
| 3 | 5.2 |
| 10 | 3.2 |
| 10 | 3.0 |
| 10 | 2.6 |
| 10 | 2.5 |
| 10 | 2.3 |
| 30 | 2.4 |
| 30 | 2.2 |
| 30 | 2.1 |
| 30 | 2.0 |
| 30 | 2.0 |
| 100 | 2.1 |
| 100 | 2.1 |
| 100 | 2.0 |
| 100 | 2.0 |
| 100 | 1.9 |
| 1,000 | 2.4 |
| 1,000 | 2.4 |
| 1,000 | 2.2 |
| 1,000 | 2.1 |

The data in this table illustrate that the UHMW PE, sintered by heating to 180° C. for periods of time less than 100 min, display a large scatter in the values of the wear coefficients, which, of course, translates into unwanted, unreliable processes and products. In addition, the values of the wear coefficients are relatively high in comparison with those for optimally, long-time-sintered polymer. The data also reveal that sintering for very long times, under the present experimental conditions 1,000 min, increases both the wear coefficient and the scatter in the data, possibly due to decomposition of the polymer. In order to produce sintered UHMW PE of the lowest wear coefficient, under the present experimental conditions, a sintering time of about 100 min is used.

Comparative Examples B and C

Example A was repeated with Stamylan UHMW PE UH 410 ($M_w$~4.10$^6$ g/mol; $T_m$=134.3° C.) and GUR 4150 ($M_w$~5-9.10$^6$ g/mol; $T_m$=133.5° C.); samples were compression molded and sintered at 180° C. as detailed above, for various periods of time. Subsequently, the wear coefficients κ of the different materials were determined according to the above-described procedure. Results similar to those in Example A were obtained, although at somewhat higher values of the wear coefficient, which possibly is due to the lower molecular weight or much broader molecular weight distribution of the UHMW PE materials used, in comparison with Stamylan UH 610.

Example 1

Stamylan UH 610 powder was suspended in xylene (4 parts powder per 100 parts xylene), which was heated under continuous stirring to a temperature of 120° C. for a period of about 10 min, until the particles became substantially translucent and had swollen until they contained 63.5 wt % of swelling agent, as determined from the increase in weight. Subsequently, the suspension of swollen UHMW PE was transferred into acetone at room temperature. The UHMW PE was removed by filtration and dried at 40° C. When in the above procedure the powder/xylene weight ratio was varied between 0.005 and 0.05, no substantial effects in subsequent processing and properties of the UHMW PE were detected.

Example 2

UHMW PE powder prepared in Example 1 was first compression molded into samples of the above dimensions at 125° C. for a period of 10 min under 4 ton yielding highly translucent, mechanically coherent sheets which were substantially free of grain boundaries and of memory of the original UHMW PE particle morphology. The sheet samples thus obtained were, subsequently, sintered at 180° C. under 4 ton, for a period of 3 min or 10 min. The wear coefficients κ of different samples were determined according to the above-described procedure. The results are collected in Table II.

TABLE II

| Sintering Time (min) | Wear Coefficient, κ ($10^{-4}$ mm$^3$/mN) |
| --- | --- |
| 3 | 2.3 |
| 3 | 2.1 |
| 3 | 2.1 |
| 10 | 2.1 |
| 10 | 2.1 |
| 10 | 2.0 |
| 10 | 2.0 |
| 10 | 1.9 |

The data in this table illustrate that UHMW PE, first swollen according to the above procedure, followed by compression molding at 125° C. (i.e. below the melting temperature, where the polymer is substantially in its solid state), then followed by heating to 180° C. for very short periods of time, here as short as 3 or 10 min, display little scatter in their wear coefficients, and that the values of latter are very low. In fact, the data show that the wear coefficients of the above materials sintered during 3 min, on average are less than 41% of the corresponding values of the samples of the identical, but non-swollen UHMW PE that was sintered under standard, reference conditions outside the present invention (Comparative Example A, see Table I). In fact, for the latter material to reach the wear coefficients that are achieved according to the present invention in 10 min or less, a period of as much as about 100 min was required.

Example 3

UHMW PE powder prepared in Example 1 was first compression molded into samples of the above dimensions at 125° C. for a period of 10 min under 4 ton yielding highly translucent, mechanically coherent sheets which were substantially free of grain boundaries and of memory of the original UHMW PE particle morphology. The sheet samples thus obtained were, subsequently, sintered at 160° C. under 4 ton, for a period of 3 min. The wear coefficients κ of different samples were determined according to the above-described procedure and yielded an average of 2.33. $10^{-4}$ mm$^3$/mN. This example shows that sintering at temperatures as low as 160° C. during periods of time as short as 3 min may yield UHMW PE objects of a high resistance against abrasive wear.

Comparative Example D

The UHMW PE powder of Example 1 was directly compression molded and sintered according to the procedure in Comparative Example A; that is without first applying the step of compression molding in the solid state at 125° C. in Example 2. Again, the wear coefficients κ of different samples were determined according to the above-described procedure, which yielded data that were substantially the same as those obtained in Comparative Example A, Table I. This Comparative Example D shows that the highly beneficial sintering characteristic imparted by the treatment described in Example 1 is substantially lost by melting and sintering, as opposed to first compacting the material below the melting temperature of the polymer according to one method of the present invention.

Example 4

Example 1 was repeated, but with GUR 4150 UHMW PE. The powder thus produced was subsequently further processed according to the method in Example 2. An average wear coefficient of 2.25. $10^{-4}$ mm$^3$/mN was measured for samples that were sintered for 10 min.

Having described specific embodiments of the present invention, it will be understood that many modifications thereof will readily appear or may be suggested to those skilled in the art, and it is intended therefore that this invention is limited only by the spirit and scope of the following claims.

What is claimed is:

1. A process for sintering polyethylene having a weight average molecular weight of more than 1,000,000 g/mol, said process comprising:
   (a) at least partly disentangling said polyethylene;
   (b) heating the at least partly disentangled polyethylene to a temperature between room temperature and the crystalline melting temperature of the polyethylene;
   (c) compacting the at least partly disentangled polyethylene at a temperature between room temperature and the crystalline melting temperature of the polyethylene;
   (d) heating the compacted polyethylene to a temperature above its crystalline melting temperature;
   (e) cooling the polyethylene to a temperature below its crystalline melting temperature.

2. The process of claim 1, wherein said at least partly disentangling is effected by a process comprising swelling said polyethylene.

3. The process according to claim 1, wherein said weight average molecular weight is at least 2,000,0000 g/mol.

4. The process according to claim 1, wherein said temperature between room temperature and the crystalline melting temperatures in steps (b) and (c) is at least 60° C.

5. The process according to claim 1, wherein said temperature between room temperature and the crystalline melting temperatures in steps (b) and (c) is at least 100° C.

6. The process according to claim 1, wherein said temperature above its crystalline melting temperature in step (d) is below 250° C.

7. The process according to claim 1, wherein said process further comprises post-treating said polyethylene after at least steps (a)-(d).

8. The process according to claim 7, wherein said post-treating includes cross-linking said polyethylene.

9. A process for sintering polyethylene, said polyethylene having
   (i) a weight average molecular weight in the range of 2,000,000-10,000,000 g/mol;
   (ii) a co-monomer content of up to 5 wt %; and
   (iii) a melting temperature of at least 115° C.; and
   said process comprising
   (a) heating said polyethylene to a temperature between room temperature and the crystalline melting temperature of the polyethylene;
   (b) compacting said polyethylene at a temperature between room temperature and the crystalline melting temperature of said polyethylene.
   (c) heating the compacted polyethylene to a temperature above its crystalline melting temperature;
   (d) cooling the polyethylene to a temperature below its crystalline melting temperature; and
   (e) cross-linking said polyethylene after at least steps (a)-(c).

10. The process according to claim 9, wherein said temperature between room temperature and the crystalline melting temperatures in steps (a) and (b) is at least 60° C.

11. The process according to claim 9, wherein said temperature between room temperature and the crystalline melting temperatures in steps (a) and (b) is at least 100° C.

12. The process according to claim 9, wherein said temperature above its crystalline melting temperature in step (c) is below 250° C.

13. The process according to claim 9, wherein said compacting of said polyethylene is effected with a pressure in the range of 10-200 MPa.

14. The process according to claim 9, wherein said polyethylene comprises co-monomer.

15. The process according to claim 9, wherein said polyethylene comprises 0.5-5 wt % co-monomer.

16. The process according to claim 9, wherein said weight average molecular weight is at least 5,000,000 g/mol.

17. An article obtained by a process according to claim 9.

18. The article of claim 17, wherein said article has a wear coefficient of less than 3.5×10$^{-4}$ mm$^3$/mN.

19. The article of claim 17, wherein said article has a wear coefficient of less than 2.5×10$^{-4}$ mm$^3$/mN.

20. The article according to claim 17, wherein said article has a yield strength of at least 5 MPa.

21. The article according to claim 17, wherein said article has a yield strength of at least 20 MPa.

22. The article according to claim 17, wherein said article has a tensile strength of at least 10 MPa.

23. The article according to claim 17, wherein said article has a tensile strength of at least 40 MPa.

24. The article according to claim 17, wherein said article is selected from the group consisting of artificial implants and orthopedic implants.

* * * * *

UNITED STATES PATENT AND TRADEMARK OFFICE
CERTIFICATE OF CORRECTION

PATENT NO. : 7,550,555 B2  Page 1 of 1
APPLICATION NO. : 10/501936
DATED : June 23, 2009
INVENTOR(S) : Smith et al.

It is certified that error appears in the above-identified patent and that said Letters Patent is hereby corrected as shown below:

In Column 2, line 29, after "compositions" insert --.--.

In Column 10, line 12, change "3.5 $10^{-4}$" to --3.5X$10^{-4}$--.

In Column 10, line 13, change "2.8 $10^{-4}$" to --2.8X$10^{-4}$--.

In Column 10, line 13-14, change "2.5 $10^{-4}$" to --2.5X$10^{-4}$--.

In Column 10, line 14, change "2.2 $10^{-4}$" to --2.2X$10^{-4}$--.

In Column 10, line 14, change "2.0 $10^{-4}$" to --2.0X$10^{-4}$--.

In Column 15, line 14, change "2.25. $10^{-4}$" to --2.25X$10^{-4}$--.

In Column 16, line 13, in Claim 9, change "polyethylene." to --polyethylene;--.

Signed and Sealed this

Fifth Day of January, 2010

David J. Kappos
*Director of the United States Patent and Trademark Office*